Aug. 30, 1966 W. A. BIRGE 3,270,336
ELIMINATING MULTIPLE RESPONSES IN A GRATING LOBE ANTENNA ARRAY
Filed June 25, 1963 4 Sheets-Sheet 1

INVENTOR.
WARREN A. BIRGE
BY
Michael A. Lileo Jr.
AGENT

INVENTOR.
WARREN A. BIRGE
BY
AGENT

INVENTOR.
WARREN A. BIRGE

United States Patent Office 3,270,336
Patented August 30, 1966

3,270,336
ELIMINATING MULTIPLE RESPONSES IN A GRATING LOBE ANTENNA ARRAY
Warren A. Birge, Winter Park, Fla., assignor to Martin-Marietta Corporation, Middle River, Md., a corporation of Maryland
Filed June 25, 1963, Ser. No. 290,453
23 Claims. (Cl. 343—5)

This invention relates to antenna scanning techniques for use in combination with a forward looking high resolution radar system and more particularly to an electronic antenna scanning technique utilizing an unambiguous single lobe transmit array and a grating lobe receive array wherein the main lobe of the transmit pattern is electronically steered relatively with the grating lobes of the receive pattern so that the product of the patterns effectively reinforces only in the direction in which the point of maximum voltage amplitude of the main lobe successively coincides with the point of maximum voltage amplitude of each of the grating lobes thereby advantageously eliminating grating lobe ambiguity.

The present invention is similar in many respects to my copending patent application Serial No. 277,165, filed May 1, 1963, entitled "Antenna System." The present invention differs primarily with such copending application in that it utilizes an unambiguous single lobe transmit array in combination with a grating lobe receive array. Since a single lobe transmit array may be beamed so as to effectively scan over the total forward looking area of the system, the number of receive antenna elements for a given array length or product beamwidth are advantageously reduced, and although a lesser number of receive elements are utilized, the net two-way gain of the present invention is approximately equal to the net two-way gain of the above mentioned copending application. Although my copending application is advantageously applicable for use with conventional high speed radar carrying vehicles or stationary installations, the reduced space requirement and simplicity of design of the present antenna system renders it more aerodynamically compatible with high speed radar carrying vehicles, and the use of an unambiguous single lobe transmit array of the present invention advantageously reduces Electronic Countermeasure (ECM) vulnerability.

For purposes of simplicity of discussion, the novel antenna system and technique of the present invention will be described in connection with a mapping radar application. It is to be understood, of course, that the inventive concepts hereinafter disclosed may be incorporated in other well known radio and radio navigation applications without departing from the spirit and scope of this invention.

In view of the present day demand for radar systems which are aerodynamically compatible with installations on high performance aircraft, it is highly desirable that such radar systems provide high angular and range resolution characteristics, operate in real time, provide a forward looking capability, undergo minimum performance degradation under the most extreme atmospheric conditions in which it will be expected to operate, and have minimum size and maintenance requirements.

In an effort to achieve the foregoing ideal radar system characteristics, it has been discovered that compatible angular resolution problems are the most difficult to solve whereas compatible range resolution is more easily achieved. By way of example, an angular resolution of one milliradian against a distributed target represents a lateral resolution of sixty feet at a range of ten nautical miles, and with present known antenna systems can be achieved only with an excessively large antenna aperture. On the other hand, a radial or range resolution of sixty feet merely requires a pulse width of approximately 0.13 microsecond, which can readily be achieved with conventional well known techniques. Therefore, the prime problem facing antenna designers is that relating to angular resolution.

It is well known to those skilled in the antenna art that high resolution radar requirements for use in high speed radar carrying vehicles places unique and difficult design requirements upon the antenna system employed. By way of example, to provide coverage over a forward looking sector, the antenna pattern must be scanned to either side of the ground track, and to minimize picture jump, the scan rate must be sufficiently high so that the radar-carrying vehicle's motion between frames is a small fraction of the resolution element. As will be apparent, for vehicle speeds approaching Mach 1, frame rates of 25 to 30 cycles per second are required. Further, as the antenna pattern or horizontal beamwidth becomes narrower, the number of angular elements in a given sector increases and the dwell time per beamwidth is correspondingly reduced for a given frame rate. Although the transmitter pulse repetition frequency (PRF) can be increased somewhat to compensate for this problem, a point is reached where average power limitations and second-time-around-echo (STAE) prevents a further increase in PRF. At this point, the picture contrast becomes an inverse function of the angular width of the sector being scanned. In addition to providing a high speed scan over a relatively large sector, it is also highly desirable for the scan format of the antenna to be flexible, so that longer dwell times over a narrow sector can be utilized to improve contrast and definition.

The foregoing necessary scan rates and scan format flexibility are difficult to achieve by mechanical means with a small antenna aperture. Clearly, with an aperture of the linear dimension required to obtain milliradian resolution (25 to 50 feet), mechanical steering is virtually impossible to achieve. As a result of the impracticability and impossibility of employing mechanical steering, antenna designers turned their efforts towards techniques employing inertia-less scan of large antenna apertures.

The prior art is replete with attempts to provide electronic scan antenna systems utilizing various inertia-less scan techniques. The most common and practical prior known attempts involve either frequency steering or phase steering techniques.

Frequency steering techniques generally employ the basic principle of changing the frequency of the RF energy propagating down a waveguide or coaxial cable so as to produce an adjustable phase taper across the antenna aperture. In the most basic frequency steering technique an array of radiating elements are predeterminedly positioned along a waveguide so that the electrical distance between the radiating elements is equal to the physical distance between the radiating elements whereupon a desired phase shift of the RF energy is produced as it propagates down the waveguide from one radiating element to the next. This desired phase shift is needed between each radiating element to steer the beam in a desired angular direction. Thus, at a particular center frequency the waveguide wavelength will be exactly that needed to produce a desired phase shift and at that frequency the beam will be steered in the desired direction. Accordingly, as the instantaneous frequency of the RF energy is varied (the condition under which space phase shift equals guide phase shift is also changed) the beam will steer in a new direction. Other frequency steering techniques employ either a zig-zag or a Serpentine waveguide with the radiating elements positioned thereon so that the electrical distance between radiating elements (over which the RF energy must propagate between radiating elements) is greater than the physical spacing between the elements. These latter techniques permit an integral number of waveguide wavelengths to exist between radiating elements along with the desired phase shift for generating a particular phase taper and has the effect of reducing the percentage frequency change needed to steer the beam over a given change in beam direction. It has been determined that the larger the ratio of electrical length to physical length, the more sensitive the steering angle is with respect to the instantaneous frequency.

Each of the foregoing frequency steering techniques possess basic disadvantages. In the basic techniques the steering sensitivity is quite low, e.g., one to two percent frequency variation being required for each degree of beam steering. Although the latter mentioned techniques can provide a satisfactory steering sensitivity when the ratio of electrical length to physical length is sufficiently large, it can be obtained only at the expense of very significant increases in volume, weight, and power loss.

The prior known phase steering techniques generally employ an independently controlled phase shifter at each radiating element to produce the desired phase taper across the aperture. In the most basic phase steering techniques, an array of radiating elements are predeterminedly positioned along a waveguide with each element having an independently controlled phase shifter to produce the desired phase taper across the aperture. The phase shifters are generally microwave ferrites or varactors. Although this type of system provides versatility and fixed frequency operation, an excessively high number of phase shifters are required for a large antenna. In addition, calibration, linearity an temperature compensation present serious operational problems.

The present invention addresses itself primarily toward solving the heretofore incompatible problems of achieving high angular resolution while maintaining aerodynamic compatibility. In particular, this invention provides a method for greatly reducing the number of active elements required to implement a large antenna array. In addition, the technique of the present invention uniquely permits electronic steering of large antenna arrays operating at high microwave frequencies without extreme power losses or complex mechanization heretofore required in prior known electronic steering techniques.

In accordance with this invention a transmit antenna configuration consisting of a single-lobe transmit antenna array (broadbeam) and a grating lobe receive antenna array (narrow beam) are utilized for use in or on long thin structures, such as, the wings of an aircraft or missile. Since the antenna arrangement of the type utilized in the present invention requires a considerably smaller number of elements over a given length than conventional prior known antenna configurations, such arrangement is preferred by those concerned with achieving high angular resolution by lightweight aerodynamic design. The present invention utilizes a Serpentine transmit array in conjunction with a grating lobe receive array with the elements of each array being substantially parallel, is such be desired. By way of example, the present invention may employ seventy transmit elements on the transmit array and ten receive elements on the receive array. This exemplary configuration generates a single lobe transmit pattern and a grating lobe receive pattern.

In order to achieve electronic steering, I employ the well known technique of frequency variation. Further, I use closely spaced transmit elements to produce a single lobe transmit pattern and utilize a plurality of receive elements across a large antenna aperture to produce a grating lobe receive pattern. By proper selection of the spacing between elements on each array, the null beamwidth of the main lobe of the transmit array may be made, for example, substantially twice as large as the spacing between any two adjacent grating lobes of the receive pattern. Accordingly, by frequency steering the transmit pattern, the main lobe may be aligned with a preselected grating lobe in the receive pattern.

More particularly, through the use of two independent frequency steering mechanisms, one for the transmit and the other for the receive, I develop a pattern relationship that advantageously eliminates inherent grating lobe ambiguity of prior known antenna scanning systems and provides a capability for scanning across a large angular area. By transmitting a varying frequency I cause the single transmit lobe to move in a predetermined angular fashion so as to achieve a degree of scan by causing the reinforced product lobe of the transmit and receive patterns to effectively move across an angular area to be scanned.

Realizing that the location of a target in the path of any one receive grating lobe cannot be ascertained with certainty because of grating lobe ambiguity, I therefore provide means in the transmit section of the system, such as in the form of a variable frequency transmitter, for varying the angular position of the reinforced product lobe that is created as a result of the alignment of the point of maximum amplitude of the single transmit lobe and the point of maximum amplitude of one of the receive grating lobes. That is to say, because the antenna arrangement employed in accordance with this invention provides a transmit pattern having a single main lobe and a receive pattern having a plurality of grating lobes, I can obtain successive reinforcement of the main lobe with adjacent grating lobes by appropriate variation in the frequency steering mechanism of the transmit array.

In the practice of this invention, a selected area can be scanned in a very effective manner despite the fact that the use of grating lobe structures in the receive pattern causes antenna lobes to be pointing in many directions across the total angular area to be scanned. In other words, by selectively aligning the point of maximum amplitude of the main lobe of the transmit pattern with the point of maximum amplitude of a particular grating lobe, the angular ambiguities due to the presence of many grating lobes in the receive pattern is advantageously eliminated.

By adjustment of the transmit array steering mechanism I first bring the point of maximum amplitude of the main lobe produced by the transmit array into alignment with the point of maximum amplitude of a preselected grating lobe produced by the receive array. Typically, the first point of alignment would involve a grating lobe directed toward one edge of the total area to be scanned. The steering mechanisms of both the transmit and receive arrays are then varied in an interrelated manner so as to steer the reinforced product lobe from its initial pointing angle to a new pointing angle several degrees clockwise or counterclockwise, as the case may be.

After the aligned main lobe and grating lobe have been steered several degrees to the limit of the angular excursion of the grating lobe, which is substantially less than the total angular area to be scanned, I then cause the aligned main and grating lobes to be brought out of alignment, this being accomplished by a predetermined control of the transmit and receive steering mechanisms. The main lobe may then be aligned with an adjacent grating lobe of the receive pattern, thus insuring that no gaps appear in the scan pattern. By variation of the transmit and receive steering mechanisms in an interrelated manner I again cause the main lobe of the transmit pattern and the adjacent grating lobe of the receive pattern to be steered several degrees in the same direction as the original scan, thereby continuing the scan pattern. By successive repetition of the foregoing main and grating lobe alignment and small synchronized angular scan, the main lobe of the transmit pattern may be caused to be sequentially brought into alignment with adjacent grating lobes of the receive pattern and appropriately steered across a small angular sector with the overall result being apparent scan of a single unambiguous reinforced lobe across the total area to be scanned.

My invention also advantageously lends itself to scanning over a limited sector of the total area to be scanned for the purpose of determining the presence or absence of a target in a suspicious sector. This latter feature may be accomplished in the practice of this invention by continuously maintaining alignment of the point of maximum amplitude of the main lobe of the transmit pattern with the point of maximum amplitude of a preselected grating lobe of the receive pattern, and to cause the resulting unambiguous product lobe to be oscillated over the desired angular sector of the total area to be scanned by proper control of the transmit and receive steering mechanisms.

As will be apparent, both the regular scan and the selected scan are each accomplished automatically by the utilization of a programmer which controls the relative action of the transmit and receive steering mechanisms.

In accordance with one embodiment of the present invention, a plurality of transmit elements arranged in a conventional serpentine configuration, and a plurality of receive elements, arranged in a grating lobe antenna configuration, are provided. The physical length between adjacent transmit and receive elements, respectively, are specifically chosen along with predetermined electrical characteristics of the coupling and frequency transmission lines so as to provide a single main lobe transmit pattern and a grating lobe receive pattern so that the null beamwidth of the main lobe of the transmit pattern is substantially twice as lareg as the angular spacing between at least two adjacent grating lobes of the receive pattern. Therefore, the product lobe pattern of the transmit and receive patterns, which represents the overall or "round trip" effective pattern, reinforces only in the direction in which the point of maximum amplitude of the transmit main lobe aligns with the point of maximum amplitude of one of the receive grating lobes so as to provide an unambiguous product pattern having a single reinforced lobe. Thus, by shifting the main lobe of the transmit pattern relative to the grating lobes of the receive pattern the single reinforced product lobe may be effectively moved across the total area to be scanned. A transmit frequency generator, such as a hydraulically tunable magnetron and servo, is employed in the transmit section of the system to provide a rapidly variable transmit frequency for steering the main lobe of the transmit pattern over the total area to be scanned.

A first local oscillator, such as a backward wave oscillator, is employed in the receive section of the system to provide a rapidly variable receive frequency for steering the grating lobes of the receive pattern over an angular sector within the total area to be scanned. At the beginning of a total scan, the transmit and receive frequencies are predeterminedly established so that the main lobe is aligned with one of the grating lobes. The transmit frequency then commences to sweep over a predetermined range of frequencies so as to cause the main lobe to scan across the total area being scanned. At the beginning of the main lobe scan, the transmit and receive frequencies are varied in synchronism so that the receive frequency is caused to track the transmit frequency.

This synchronized variation of the transmit and receive frequencies causes the main lobe to be aligned with one of the grating lobes until the grating lobe reaches the extremity of its sector scan. Since the main lobe has not reached the extremity of its scan, further variation in the transmit frequency causes the main lobe and the first grating lobe to go out of alingment. At this point, the receive frequency is returned to its original frequency thereby causing the grating lobes to return to their original pointing angle. Thus, since the main lobe is displaced an angular distance substantially equal to the angular scan of the grating lobes, it is caused to align with a grating lobe adjacent to the first grating lobe. The receive frequency is again caused to vary in synchronism with the transmit frequency variation over its predetermined range of frequencies thereby causing the main lobe to be aligned with the second grating lobe until it reaches the extremity of its sector scan. The foregoing main lobe and grating lobe alignment and synchronized transmit and receive frequency variation is repeated until the main lobe has reached the extremity of its scan whereby both the transmit and receive frequencies are returnd to their original frequency and a second total area scan may be commenced.

It is accordingly a primary object of the present invention to provide an antenna scanning system for use with transmit and receive arrays which generates a transmit pattern having a single main lobe and a receive pattern having a plurality of spaced grating lobes wherein the use of two independent frequency steering mechanisms, one for the transmit and the other for receive, develops a pattern relationship that eliminates inherent grating lobe ambiguity and provides a capability for scanning across a large angular area.

It is another object of the present invention to provide an antenna scanning system of the type described which generates a single lobe transmit pattern and a grating lobe receive pattern wherein the null beamwidth of the main lobe of the transmit pattern is substantially twice as large as the angular spacing between at least two adjacent grating lobes of said receive pattern so that the product of the two patterns are reinforced only in the direction in which the point of maximum amplitude of the main lobe aligns with the point of maximum amplitude of one grating lobe of the receive pattern so as to produce an unambiguous product pattern having a single reinforced lobe.

It is another object of the present invention to provide an antenna scanning system of the type described wherein the shifting of the transmit and receive antenna patterns relative to each other permits steering of the reinforced lobe of the product pattern over any angular section between successive pointing angles of the reinforced product lobe.

It is another object of the present invention to provide an antenna scanning system of the type described wherein the product lobe pattern of the transmit and receive patterns is reinforced only in the direction in which the point of maximum amplitude of the main lobe of the transmit pattern coincides with the point of maximum amplitude of one grating lobe of the receive pattern so as to provide an unambiguous product pattern having a single reinforced lobe, and the direction of reinforcement of the transmit and receive patterns is moved along the total area to be scanned by independently varying the transmit and receive frequencies and the reinforced product lobe is caused to scan the angular sections between each successive reinforced product lobe position by synchronously sweeping the transmit and receive frequencies over a predetermined range of frequencies.

It is another object of the present invention to provide an antenna scanning system of the type described wherein a plurality of transmit and receive elements are predeterminedly positioned in transmit and receive antenna arrays, respectively, wherein the null beamwidth of the main lobe of the transmit pattern is substantially twice as large as the angular spacing between any two adjacent grating lobes of the receive pattern so that the product pattern of the transmit and receive patterns is reinforced only in the direction in which the point of maximum amplitude of the main lobe is aligned with the point of maximum amplitude of one of the grating lobes of the receive pattern so as to produce an unambiguous product pattern having a single reinforced lobe.

It is another object of the present invention to provide an antenna scanning system for radar and radio navigation networks which has high angular and range resolution, operates in real time, provides forward looking capability, has reduced performance degradation under extreme atmospheric conditions, and has reduced size and maintenance requirements.

It is another object of the present invention to provide an antenna scanning system for radar and radio navigation networks which is simple in construction, economical to manufacture, and highly reliable in performing the intended functions and achieving the desired objects.

These and further objects and advantages of the present invention will become more apparent upon reference to the following description and claims and the appended drawings wherein:

For purposes of clarity and understanding, corresponding elements and dimensions in the several figures will be designated with similar reference characters.

Figure 1:
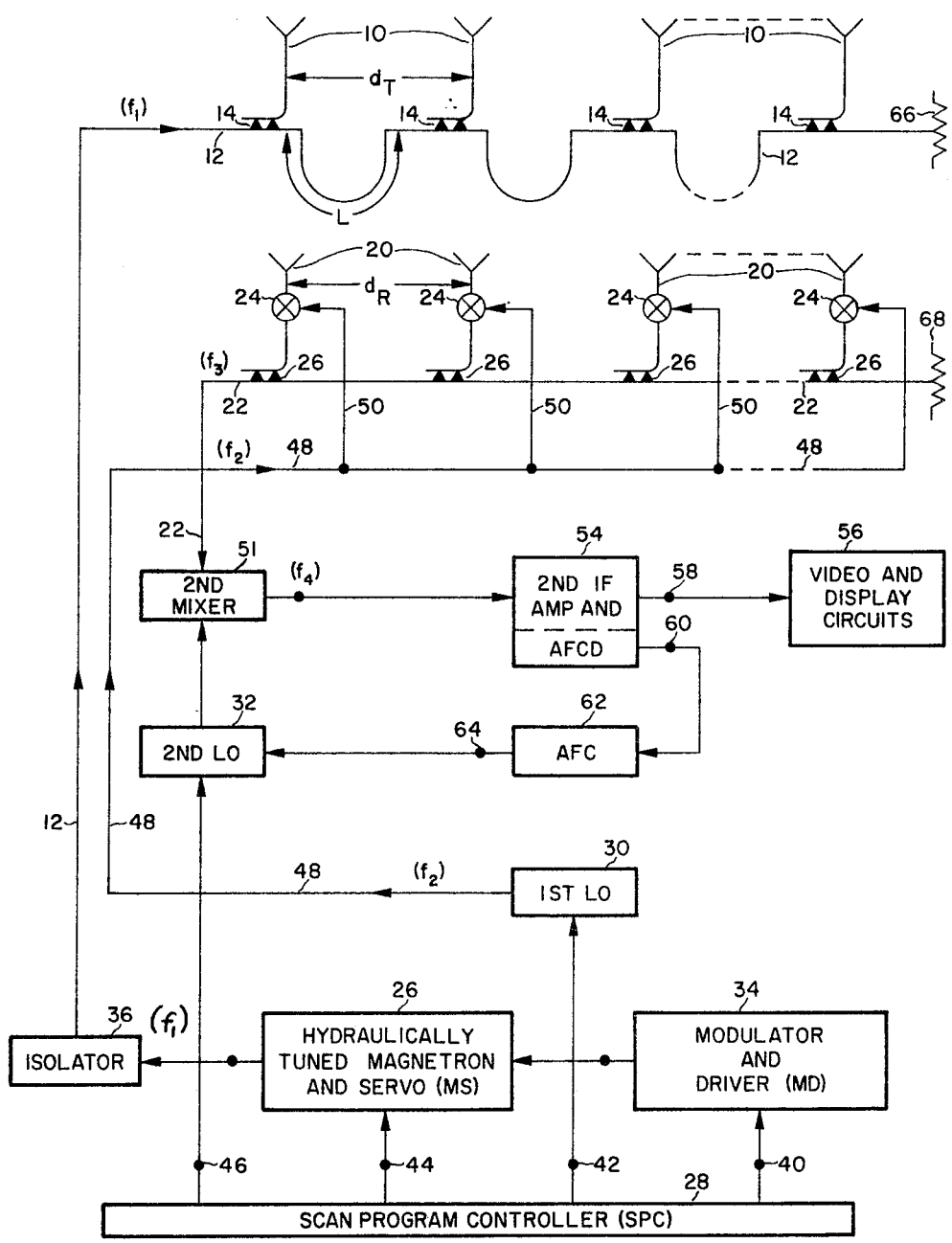
FIGURE 1 depicts a block diagram of one embodiment of the present invention.

*Detailed description—FIGURE 1*

Referring now to FIG. 1, there is shown a block diagram of a basic embodiment of the present invention. The transmitting elements 10 are each connected to a serpentine waveguide 12 by a directional coupler 14 and are separated by a distance $d_T$. The receiving elements 20 are each connected to a waveguide 22 through a mixer 24 and a directional coupler 26 and are separated by a distance $d_R$. As will be discussed more fully in detail regarding the mathematical analysis of the transmit and receive antenna arrays of FIGS. 6 and 7, the distance $d_T$ is specifically chosen so that the transmit voltage pattern (see FIG. 2) comprises a single main lobe having a null beamwith $\theta_{NT}$ and the distance $d_R$ chosen so as to provide a receive voltage pattern (see FIG. 3) comprising a plurality of grating lobes with each lobe having a null beamwith $\theta_{NR}$ and separated by an angular spacing $\theta_{SR}$. The transmit antenna array is commonly referred to as a filled-in or broad-beam antenna, whereas the receive antenna array is commonly referred to as a grating lobe antenna.

A hydraulically Tunable Magnetron and Servo (MS) 26, or any other variable frequency power source, is provided for generating a controlled rapidly variable, transmit frequency $f_1$ sufficient to steer the transmit beam across a total angular area to be viewed. A Scan Program Controller (SPC) 28 is provided for controlling the MS 26 as well as a First Local Oscillator (1st L.O.) 30, a Second Local Oscillator (2nd L.O.) 32, and a Modulator and Driver (MD) 34. The SPC 28 has at least four output terminals, 40, 42, 44 and 46. SPC 28 delivers a timing pulse to the MD 34 through terminal 40. This timing pulse controls the application of a high voltage pulse to the MS 26 for developing the transmit frequency $f_1$. A voltage level signal from the SPC 28 is applied to the 1st L.O. 30 through terminal 42 for establishing the frequency $f_2$ of the 1st L.O. 30. A second voltage level signal from SPC is applied to the servo section of the MS 26 via the terminal 44 for controlling the transmit frequency $f_1$ of the Magnetron section of the MS 26. Lastly, a third voltage level signal from SPC 28 is delivered to the 2nd L.O. 32 via the terminal 46 for establishing the frequency of the 2nd L.O. 32.

The transmit frequency $f_1$ generated by the MS 26 is applied to the transmit elements 10 via the isolator 36, waveguide 12, and directional couplers 14. The isolator 36 is coupled between the waveguide 12 and the MS 26 for isolating the magnetron section of the MS 26 from the variable impedance presented by the transmitting section (i.e. elements 10, waveguide 12, and couplers 14) as the transmit frequency $f_1$ varies. Any well known isolator may be used so long as it compensates for the inherent sensitivity of a magnetron to its load. It is to be understood that if any other well known variable frequency generator is substituted for the MS 26, the isolator may not be necessary and may, therefore, be excluded from the circuit without departing from the spirit of scope of the present invention.

The frequency $f_2$ generated by the 1st L.O. 30 is applied to each of the mixers 24 via conductors 48 and 50. The frequency $f_2$ is then mixed with the reflections of the transmit frequency $f_1$, which are received by the receive elements 20 and also applied to each of the mixers 24, so as to develop a First Intermediate Frequency (1st I.F.) $f_3$. The 1st I.F. $f_3$ is coupled to the second mixer (2nd mixer) 50 via couplers 26 and waveguide 22. The frequency generated by the 2nd L.O. 32 is also applied to the 2nd mixer 51 which is tuned to pass a Second Intermediate Frequency (2nd I.F.) $f_4$. The 2nd I.F. $f_4$, developed by the 2nd mixer 51, is applied to the Second Intermediate Frequency Amplifier and Automatic Frequency Control Discriminator (2nd I.F. Amp and AFCD) 54. The amplified 2nd I.F. $f_4$ may then be coupled to appropriate Video and Display Circuits 56 via output terminal 58. The 2nd I.F. Amp and AFCD 54 also develops a second output signal which is delivered via output terminal 60 to the Automatic Frequency Control (AFC) circuit 62. The output signal of the AFC 62 is then delivered via terminal 64 to the second L.O. 32 wherein it is used to synchronize and fine control the frequency generated by the 2nd L.O. 32. The circuit which includes the AFCD section of the 2nd I.F. Amp and AFCD 54, the AFC circuit 62, and the 2nd L.O. 32, constitute what is commonly referred to as the AFC "loop." It should be noted, that the waveguides 12 and 22 are respectively terminated by conventional resistive loads 66 and 68.

It should be further noted, that in the embodiment of FIG. 1, a portion of the AFC circuitry is made a part of the 2nd I.F. Amp and AFCD 54 while the remaining AFC circuitry is independent of the 2nd I.F. Amp and AFCD 54. It will be apparent therefore that other well known AFC "loop" circuits may be readily substituted without departing from the spirit and scope of the present invention. In addition, well known voltage-controlled frequency type oscillators, such as backward wave oscillators, may be incorporated as the 1st and 2nd local oscillators if desired.

Figure 6:
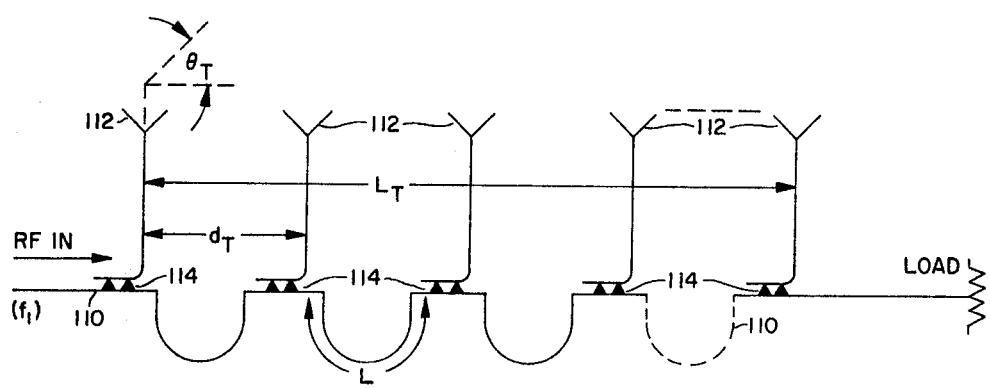
FIGURE 6 depicts a schematic of the transmitting section of the present invention showing the transmit elements and waveguide transmission line.
Figure 7:
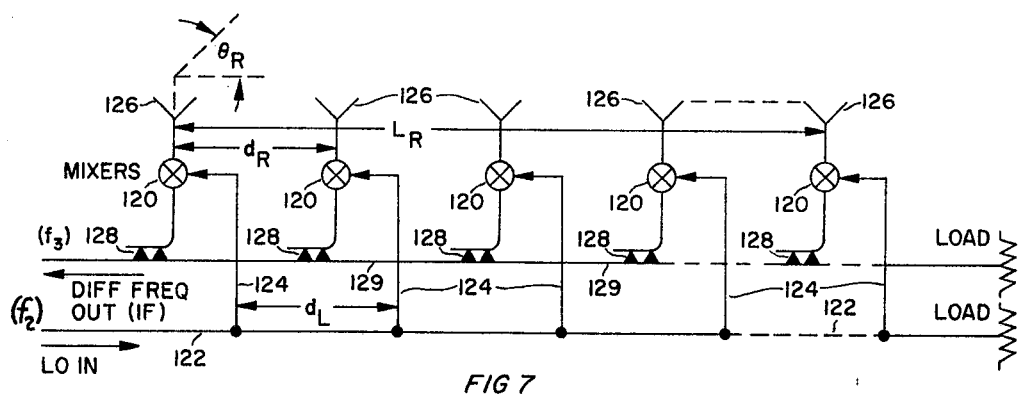
FIGURE 7 depicts a schematic of the receive section of the present invention showing the receive elements, serpentine waveguide, transmission line and mixers.

For purposes of clarity and understanding, a detailed description of FIGURES 2–5 and a mathematical analysis of the transmit antenna array of FIG. 6 and receive antenna array of FIG. 7 will be presented before describing the mode of operation of the block diagram of FIG. 1. The purpose for this form of presentation will become more apparent hereinafter, and it will suffice to now state that a clearer understanding of the scientific principles in the operation of the embodiments of FIGURES 1 and 8 will be possible when the operation of the transmit and receive arrays of FIGS. 6 and 7 in conjunction with the lobe structure of FIGS. 2–5 are better understood.

*Detailed description—FIGURES 2–5*

Figure 2:
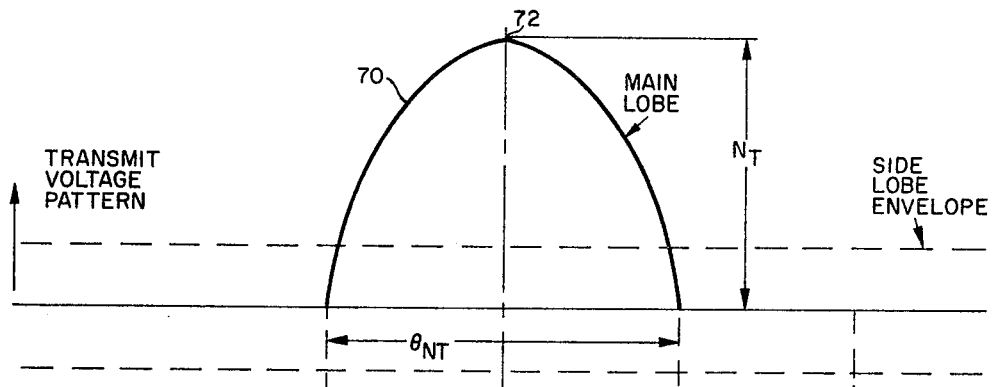
FIGURES 2–4 are Cartesian charts of transmitting, receiving the product lobe patterns, respectively, with relative power plotted as the ordinate and the angle off boresight plotted as the abscissa.
Figure 3:
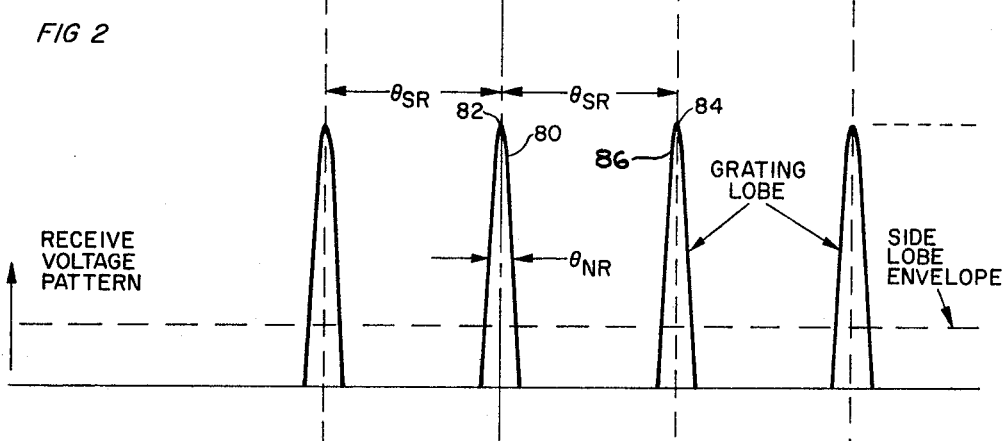
Figure 4:
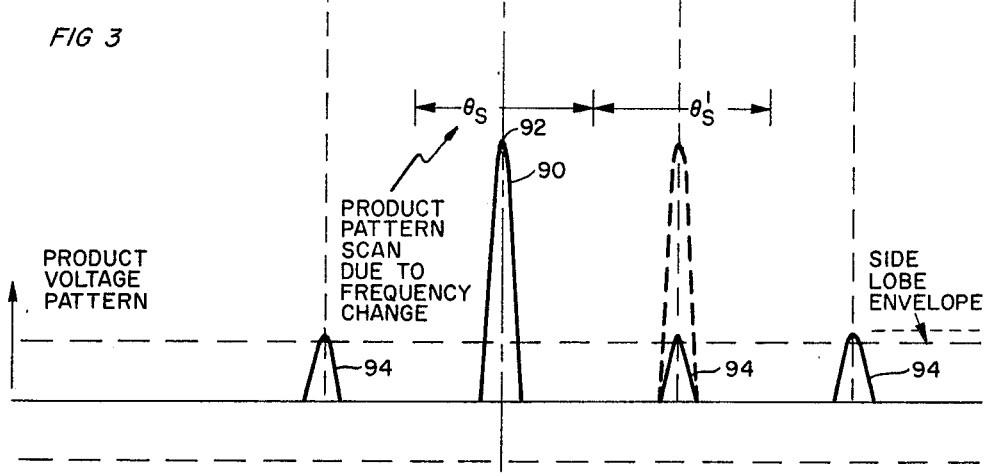
Figure 5:
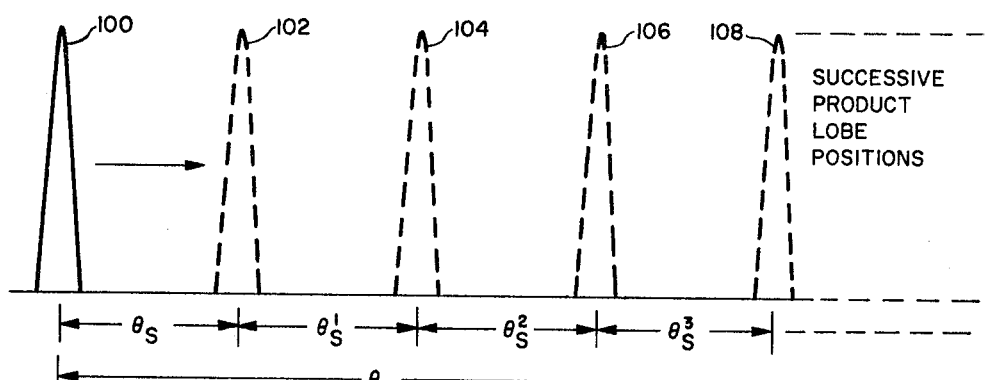
FIGURE 5 is a Cartesian chart of the product lobe pattern with relative power plotted as the ordinate and the angle off boresight plotted as the abscissa and showing the product lobe when in its reference position in solid lines and the product lobe when in successive positions in dotted lines.

Referring now in detail to FIGS. 2–4, there are shown Cartesian charts of exemplary transmit, receive and product lobe patterns, respectively, of the transmit and receive antennas of the present invention, with relative power plotted as the ordinate and the angle off boresight, i.e., wavelengths, ploted as the abscissa. FIGS. 2 and 3 show the lobe structures established in the transmit and receive antenna patterns, respectively, and FIG. 4 shows the product pattern of the transmit and receive patterns, which comprises a single lobe, unambiguous structure.

With regard to FIGS. 2 and 3, it will be noted that at points where the grating lobes of the receive pattern coincide with side lobes of the transmit pattern, the side lobe level of the product voltage pattern (FIG. 4) is slightly increased. However, since this occurs at all points except where the point of maximum amplitude of one grating lobe of the receive pattern coincides with the point of maximum amplitude of the main lobe of the transmit pattern the increase in integrated side lobe level is insignificant. It will be further noted, respecting FIGS. 2–4 that the null beam width $\theta_{NT}$ of the main lobe 70 is approximately twice as large as the lobe spacing $\theta_{SR}$ between adjacent grating lobes of the receive pattern. That is to say, the null beam width of the main lobe 70 is approximately as large as the spacing between any three adjacent grating lobes of the receive pattern, i.e.:

$$\theta_{NT} = 2\theta_{SR}$$

In the examples shown in FIGS. 2–4, the lobe patterns are registered so that the point of maximum amplitude 72 of the main lobe 70 coincides with the point of maximum amplitude 82 of the grating lobe 80. Accordingly, by varying the transmit frequency $f_1$ and the 1st L.O. frequency $f_2$ in synchronism, the product lobe 90 is caused to sweep out an angular sector $\theta_S$ (see FIGS. 4–5) which is substantially smaller than $\theta_C$, the total area to be scanned. In order to scan the next adjacent sector $\theta_S^1$, the transmit frequency $f_1$ must be changed to a new frequency level within its range and the 1st L.O. frequency $f_2$ must be returned to an initial frequency value. Accordingly, by moving the main lobe 70 relative to the grating lobes of the receive pattern an amount substantially equal to the angular spacing $\theta_{SR}$, the point of maximum amplitude 72 of the main lobe 70 is caused to coincide with the point of maximum amplitude 84 of the grating lobe 86. Thus, the product voltage pattern will be reinforced at a new pointing angle $\theta_S^1$, which is displaced from the original pointing angle $\theta_S$, as shown in FIG. 4. In the example shown, the reinforced lobe 90 would be in the position shown by the dotted lines in FIGS. 4 and 5. Then, by again synchronously varying the transmit and 1st L.O. frequencies, the reinforced lobe is caused to scan the sector $\theta_S^1$.

The foregoing procedure may be repeated so that successive sectors ($\theta_S^2$, $\theta_S^3$ ... $\theta_S^N$) may be scanned or the transmit and local oscillator frequencies may be caused to continuously sweep a small portion of their frequency range so that a preselected sector within the total area to be scanned may be continuously viewed, particularly when it is decided to view a target within that sector.

*Mathematical analysis—FIGURE 6 transmitter*

Referring now to FIGURE 6, there is shown an exemplary schematic of a single lobe (board beam) transmitting antenna which may be used in the antenna system of the present invention. In this exemplary embodiment of the transmitting section, the transmitting elements 112 may consist of either directional couplers 114 connected to radiating elements 112 or slots milled in the wall of the waveguide 110 (not shown). Any well known method of connecting the radiating element 112 to the waveguide 110 may be used without departing from the spirit and scope of the present invention. If the slot locations or coupler values or other means for connecting the radiating elements, are chosen to give a uniform amplitude taper, it can be shown that the horizontal-plane (far field) voltage pattern of the transmitting antenna is given by the following equation:

(1) $$f_T(\theta\lambda_1) = \frac{\sin\frac{No}{2}(\phi_T+\alpha)}{\sin\frac{1}{2}(\phi_T+\alpha)}$$

where, $$\phi_T = \frac{2\pi d_T}{\lambda_1}\sin\theta$$

$$\alpha = \frac{2\pi L}{\lambda_{1G}}$$

$\lambda_1$ = freespace wavelength (*fswl*) at transmitter frequency ($f_1$)

$\lambda_{1G}$ = guide wavelength (*gwl*) at transmitter frequency ($f_1$)

A major lobe will occur whenever the denominator of Equation 1 goes to zero, i.e., whenever, $$\frac{1}{2}(\phi_T+\alpha) = K\pi$$

where, $$K = \ldots -1, 0, 1 \ldots \text{etc.}$$

or when, (2) $$\phi_T + \alpha = 2\pi\left(\frac{d_T}{\lambda_1}\sin\theta + \frac{L}{\lambda_{1G}}\right) = K2\pi$$

For purposes of clarity and understanding a center wavelength ($\lambda^\circ_1$) is defined as the point at which the major lobe is directed precisely on boresight. If $\lambda^\circ_{1G}$ represents the corresponding guide wavelength, the transmitter element spacing will be such that, (3) $$\frac{d_T}{\lambda^\circ_{1G}} = K = \text{integer}$$

By substituting Equation 3 in Equation 2, Equation 2 can be rewritten at the center frequency as, $$\frac{d_T}{\lambda^\circ_1}\sin\theta + \frac{L}{\lambda_{1G}} = \frac{L}{\lambda^\circ_{1G}}$$

(4) $$\sin\theta = \frac{L}{d_T}\left[\frac{\lambda_1}{\lambda^\circ_{1G}} - \frac{\lambda_1}{\lambda_{1G}}\right]$$

*Mathematical analysis—FIGURE 7 receiver*

Referring now to FIGURE 7, there is shown an exemplary schematic of a grating lobe receiving antenna which may be used in the antenna system of the present invention. The mechanization of the receiving section is different than the transmitting section since it is necessary to scan the receive pattern over an angle considerably smaller than the scan of the transmit pattern. Scanning may be achieved, for example, by physical connecting mixers 120 at the port of each receiving element 126, which mixers 120 act to introduce a phase taper onto the incoming frequency $f_2$. The phase taper on the frequency $f_2$ is caused by phase retardation of the local oscillator frequency $f_2$ as it propagates down the local oscillator bus 122. Also, an additional phase taper is introduced by the variable difference frequency $f_3$ propagating down the output bus 129. Accordingly, by varying the local oscillator frequency $f_2$, the receive pattern may be steered relative to the transmit pattern.

It should be noted at this point that due to the incoherent addition of noise at each port compared with the coherent addition of signal, no additional mixer noise is introduced with this plural mixer technique than would be with a single mixer technique.

The voltage pattern of the receiving antenna is given by the following equation:

(5) $$f_R(\theta, \lambda_1, \lambda_2, \lambda_3) = \frac{\sin\frac{N}{2}(\phi_R+\beta+\alpha)}{\sin\frac{1}{2}(\phi_R+\beta+\alpha)}$$

where, $$\phi_R = \frac{2\pi d_R}{\lambda_1} \sin \theta$$

$$\beta = \frac{2\pi d_R}{\lambda_{3G}}$$

$$\gamma = \frac{2\pi dL}{\lambda_{2G}}$$

$\lambda_1$=freespace wavelength (*fswl*) at transmitter frequency ($f_1$)
$\lambda_{3G}$=guide wavelength (*gwl*) at difference frequency ($f_3$)
$\lambda_{2G}$=guide wavelength (*gwl*) at local oscillator frequency ($f_2$)

The steering sensitivity of the receiving array with respect to both changes in transmitter frequency $f_1$ and changes in local oscillator frequency $f_2$ may be mathematically determined as follows:

As mentioned above with regard to the transmit array, major lobes of the receiving pattern will occur whenever the denominator of Equation 5 goes to zero, i.e., whenever, $$\frac{1}{2}(\phi_R + \beta + \gamma) = K^1 \pi$$

where, $$K^1 = \ldots -1, 0, 1 \ldots \text{etc.}$$

or when (6) $$\frac{d_R}{\lambda_1} \sin \theta + \frac{d_R}{\lambda_{3G}} + \frac{d_R}{\lambda_{2G}} = K^1$$

The center wavelengths, $\lambda°_{2G}$ and $\lambda°_{3G}$ and the distances $d_R$ and $d_L$ are chosen so that, (7) $$\frac{d_R}{\lambda°_{3G}} = N_3 = \text{integer}$$

and, (7¹) $$\frac{dL}{\lambda°_{2G}} = N_2 = \text{integer}$$

When all three frequencies $f_1$, $f_2$ and $f_3$ are at their center values, Equations 7 and 7¹ can be substituted in Equation 6 and Equation 6 can be rewritten as, $$\frac{d_R}{\lambda°_1} \sin \theta + N_2 + N_3 = K^1$$

or (8) $$\sin \theta = (K^1 - N_2 - N_3)\frac{\lambda°_1}{d_R}$$

Accordingly, Equation 8 describes the pointing angle of the receiving lobes at the systems center frequency.

The constant, $K^1$, may now be written in terms of the number $L_j$ since, (9) $$K^1 = N_2 + N_2 + L_j$$

Hence, the center frequency pointing angle of the receive lobes becomes,

(10) $$\sin \theta_{jR} = L_j \frac{\lambda°_1}{d_R}$$

The pointing angle for any combination of frequencies may be determined by substituting Equations 7, 7¹ and 9 into Equation 6. Thus, $$\frac{d_R}{\lambda_1} \sin \theta_{jR} + N_2 \frac{\lambda°_{2G}}{\lambda_{2G}} + N_3 \frac{\lambda°_{3G}}{\lambda_{3G}} = N_2 + N_3 + L_j$$

or

(11) $$\sin \theta_{jR} = \frac{\lambda_1}{d_R}\left[N_2\left(1 - \frac{\lambda°_{2G}}{\lambda_{2G}}\right) + N_3\left(1 - \frac{\lambda°_{3G}}{\lambda_{3G}}\right) + L_j\right]$$

or, rewriting in terms of Equations 7 and 7¹,

(12) $$\sin \theta_{jR} = \lambda_1\left[\frac{1}{\lambda°_{2G}} - \frac{1}{\lambda_{2G}}\right] + \frac{d_L}{d_R}\left[\frac{1}{\lambda°_{3G}} - \frac{1}{\lambda_{3G}}\right] + \frac{\lambda_1}{d_R}L_j$$

In order for the sector scan of the product lobe to take place, the transmit pattern null beamwidth must be equal to twice the grating lobe separation of the receive pattern. On boresight, at center frequency, the lobe separation of the receive pattern is found from Equation 5 to be

(13) $$\theta_{SR} = \frac{\lambda°_1}{d_R}$$

Letting $N_0$ equal the total number of transmit elements, the null beamwidth of the transmitting pattern on boresight is, from Equation 1,

(14) $$\theta_{NT} = \frac{2\lambda°_1}{N_0 d_T}$$

To satisfy the sector scan requirement, it is necessary that the system have, at center frequency,

(15) $$2\theta_{SR} = \theta_{NT}$$

or (15¹) $$d_R = N_0 d_T$$

Substituting Equation 15¹ into Equation 4 yields

(16) $$\sin \theta = \frac{LN_0}{d_R}\left[\frac{\lambda_1}{\lambda°_{1G}} - \frac{\lambda_1}{\lambda_{1G}}\right]$$

Equations 12 and 16 represent complete general expressions for the pointing angles of the transmit major lobe and the J$^{th}$ lobes of the receive arrays, respectively, in terms of the receive element spacing $d_R$, the number of transmit elements $N_0$, and the transmit, difference and local oscillator wavelengths, $\lambda_1$, $\lambda_2$ and $\lambda_3$, respectively. Thus, any specific mechanization of the antennas of the present invention may be mathematically determined by utilization of Equations 12 and 16, above. However, any other specific antenna system may be utilized without departing from the spirit and scope of the present invention providing such other system generates transmit and receive patterns in which the beamwidth of the main lobe of the transmit pattern is substantially twice as large as the spacing between adjacent grating lobes of the receive pattern.

*Mathematical analysis—product pattern*

The two-way voltage pattern of a system employing the transmit and receive arrays of FIGS. 6 and 7, for example, is given by the product of Equations 1 and 5, or

(17) $$f = f_T(\theta, \lambda_1) f_R(\theta, \lambda_1, \lambda_2, \lambda_3)$$

$$= \frac{\sin \frac{N_0}{2}(\tau\phi + \alpha)}{\sin \frac{1}{2}(\phi_T + \alpha)} \times \frac{\sin \frac{N}{2}(\phi_R + \beta + \gamma)}{\sin \frac{1}{2}(\phi_R + \beta + \gamma)}$$

If $$N_0(\phi_T + \alpha) = \phi_R + \beta + \gamma$$

then

(18) $$f = \frac{\sin \frac{N}{2}(\phi_R + \beta + \gamma)}{\sin \frac{1}{2}(\phi_T + \alpha)}$$

or,

(19)
$$f = \frac{\sin\frac{N}{2}(\phi_R+\beta+\gamma)}{\sin\frac{1}{2}\frac{(\phi_R+\beta+\gamma)}{N_0}}$$

or

(20)
$$f = \frac{\sin\frac{NN_0}{2}(\phi_T+\alpha)}{\sin\frac{1}{2}(\phi_T+\alpha)}$$

Equations 19 and 20 clearly show that the product pattern approaches that for a single-lobed or "filled-in" one-way array as $N_0$ becomes large.

From the condition $$N_0(\phi_T+\alpha)=\phi_R+\beta+\gamma$$

(21) $\quad \frac{N_0 d_T}{\lambda_1}\sin\theta + \frac{N_0 L}{\lambda_{1G}} = \frac{d_R}{\lambda_1}\sin\theta + \frac{d_R}{\lambda_{3G}} + \frac{d_L}{\lambda_{2G}}$ The above relationship may be satisfied if

(22) $\quad\quad\quad N_0 d_T = d_R$ and

(23) $\quad\quad\quad \frac{N_0 L}{\lambda_{1G}} = \frac{d_R}{\lambda_{3G}} + \frac{d_L}{\lambda_{2G}}$ It should be noted that the first condition, Equation 22, is the same as that previously described by Equation 15. Equation 23 describes the relationship between $\lambda_1$, $\lambda_2$, and $\lambda_3$.

Mode of operation—FIGURE 1

With reference to the block diagram of FIGURE 1 in view of the foregoing description of FIGURES 2–7, the operation of this first exemplary embodiment is as follows:

The physical lengths $d_T$ and $d_R$ and the electrical characteristics of the transmit and receive elements 10 and 20 and the waveguides 12 and 22, respectively, are specifically chosen so as to provide a main lobe 70 having a null beamwidth $\theta_{NT}$ which is substantially twice the lobe spacing $\theta_{SR}$ between adjacent grating lobes 80, 86 . . . etc.

The transmit frequency $f_1$, developed by the MS 26, SPC 28 and MD 34 is varied over a range of frequencies $f_1^1$ . . . $f_1^N$ thereby angularly steering the main lobe 70 over a total area to be scanned, such as 90° to 180°, or over a predetermined angular sector substantially smaller than the total area to be scanned, such as 2° to 6°.

The receive frequency $f_2$, developed by the 1st L.O. 30 and SPC 28 is also varied over a predetermined range of frequencies $f_2^1$ . . . $f_2^N$ thereby angularly steering the grating lobes 80, 86 . . . etc. over an angular sector substantially smaller than the total area to be scanned, such as, 2° to 6°.

At the begnnning of a total scan, the frequencies $f_1$ and $f_2$ of MS 26 and 1st L.O. 30, respectively are predeterminedly established so that the main lobe 70 is aligned for example with the grating lobe 80, as shown in FIGS. 2 and 3. The frequency $f_1$ of the MS 26 is then varied over a predetermined range of frequencies, $f_1^1$ . . . $f_1^N$ thereby causing the main lobe 70 to scan across the total area to be scanned. The SPC 28 controls the frequency sweep of both the MS 26 and 1st L.O. 30. When the point of maximum amplitude 72 of main lobe 70 aligns with the point of maximum amplitude 82 of grating lobe 80, the SPC causes the frequency $f_2$ of 1st L.O. 30 to vary in synchronism with the frequency $f_1$ of MS 26. This synchronized variation of frequencies $f_1$ and $f_2$ causes the main lobe 70 to be aligned with the grating lobe 80 until the grating lobe 80 reaches the extremity of its sector scan. Since the main lobe 70 has not reached the extremity of its scan, further variation of the frequency $f_1$ causes the main lobe 70 and grating lobe 80 to go out of alignment. At this point, the SPC 28 causes the frequency $f_2$ of the 1st L.O. 30 to return to its original frequency $f_2^1$ thereby causing the grating lobes 80, 86 . . . etc. to return to their original pointing angles. When the main lobe 70 aligns with the grating lobe 86, the SPC 28 again causes the frequency $f_2$ of the 1st L.O. 30 to vary in synchronism with frequency $f_1$ of the MS 26 thereby causing the main lobe 70 to be aligned with the grating lobe 86 until it reaches the extremity of its sector scan. The foregoing main lobe and grating lobe alignment and synchronized transmit and receive frequency variations is repeated until the main lobe 70 reaches the extremity of its scan whereby both the MS 26 frequency $f_1$ and the 1st L.O. frequency $f_2$ are returned to their original frequency $f_1^1$ and $f_2^1$, respectively, and a second total area scan commenced if desired.

The signals (in this case the reflected transmit frequency $f_1$) received by the receive elements 20 are respectively delivered to the mixers 24 and mixed with the local oscillator frequency $f_2$ so as to develop a first Intermediate Frequency (1st I.F.) or difference frequency $f_3$. The 1st I.F. $f_3$ is then coupled to the 2nd mixer 51 via conductor 22 where it is mixed with the frequency developed by the 2nd L.O. 32 so as to develop a second Intermediate Frequency (2nd I.F.) $f_4$. The 2nd I.F. $f_4$ is then delivered to the 2nd I.F. Amp and AFCD 54. A portion of the second I.F. $f_4$ is then amplified and coupled to conventional video and display circuits 56 (or to any desired signal utilization circuit) while the remaining portion of the 2nd I.F. $f_4$ is coupled to a conventional AFC Discriminator circuit in the 2nd I.F. Amp and AFCD 54. The signal developed by the AFCD section of the 2nd I.F. Amp and AFCD 54 is then fed to an AFC circuit 62 wherein an AFC signal is developed for maintaining the frequency of the second L.O. 32 at a desired value. The frequency of the 2nd L.O. 32 is, however, primarily controlled by the SPC 28. As mentioned above, the isolator 36 is included in the circuit for isolating the MS 26 from the variable impedance presented by the transmit elements 10 as the transmit frequency $f_1$ varies. The terminating loads 66 and 68 prevent unwanted reflections of the signals traveling along the waveguides 12 and 22 respectively.

Figure 8:
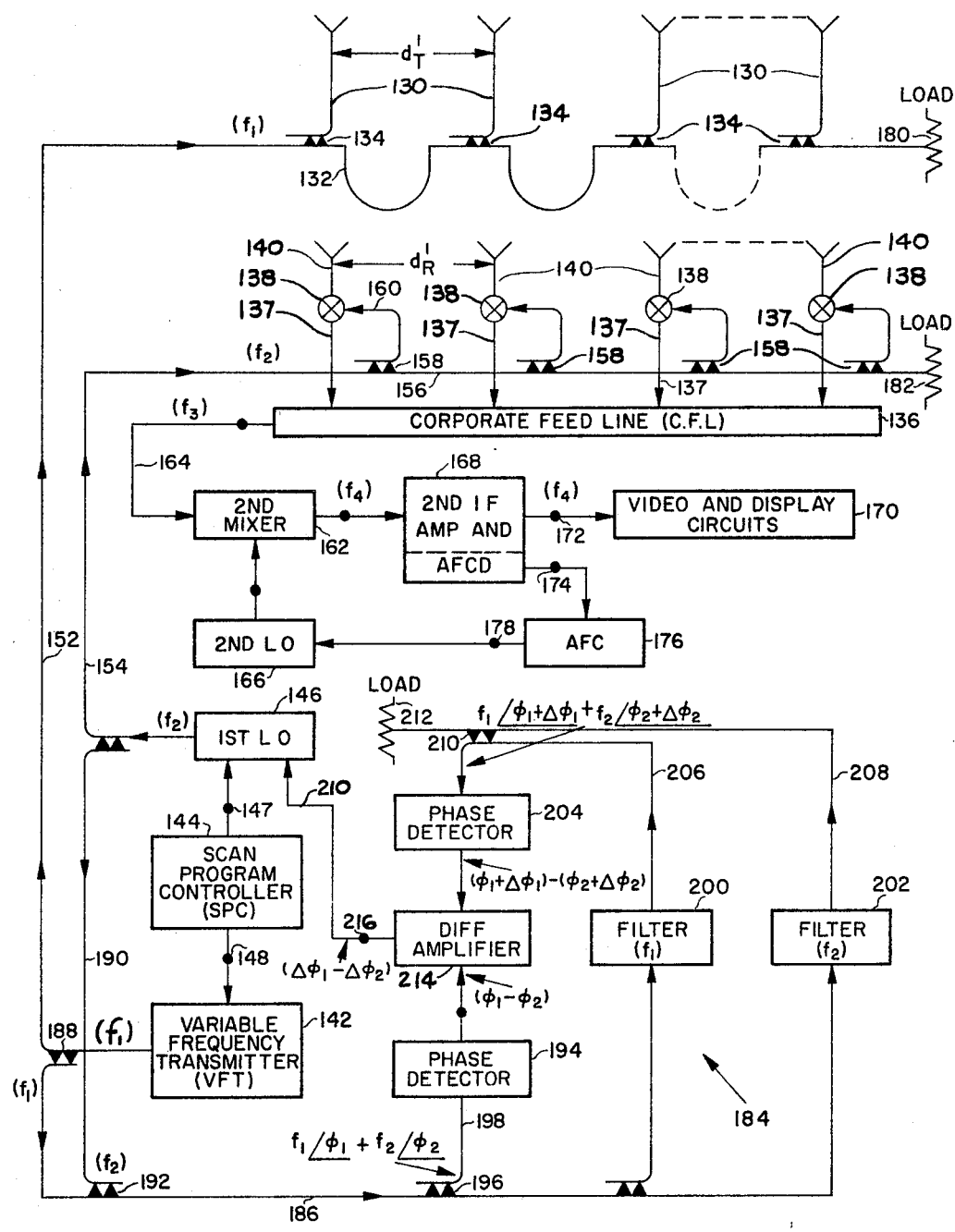
FIGURE 8 depicts a block diagram of another embodiment of the present invention.

Detailed description—FIGURE 8

Referring now to FIG. 8, there is shown a block diagram of an alternate embodiment of the present invention. The transmit elements 130 are each connected to a serpentine waveguide 132 by directional couplers 134 and are separated by a distance $d_T^1$. The receiving elements 140 are each connected to a corporate feed line (CFL) 136 through a mixer 138 and conductor 137 and are separated by a distance $d_R^1$. As mentioned above in detail regarding the mathematical analysis of the transmit and receive arrays of FIGS. 6 and 7, the distance $d_T^1$ is specifically chosen so as to provide a transmit pattern having a signal main lobe with a null beamwidth $\theta_{NT}$ (see FIG. 2) which is substantially twice as large as the angular spacing $\theta_{SR}$ between any two adjacent grating lobes of the received pattern (see FIG. 3). That is to say, the relationship between the null beamwidth $\theta_{NT}$ of the main lobe of the transmit pattern and the lobe spacing $\theta_{SR}$ between adjacent grating lobes of the receive pattern may be represented by the following expression:

$$\theta^N{}_T = 2\theta_{SR}$$

where, $\theta_{NT}$=main lobe null beamwidth
$\theta_{SR}$=grating lobe spacing It should be noted that the transmit and receive arrays of this embodiment are substantially the same as the transmit and receive arrays of FIGS. 6 and 7, respectively, and have lobe patterns substantially the same as that depicted in FIGS. 2 and 3, respectively.

A Variable Frequency Transmitter (VFT) is provided for generating a controlled, rapidly variable transmitting frequency $f_1$ which is sufficient to steer the main lobe of the transmit pattern over the total forward looking area to be scanned. A Scan Program Controlled (SPC) 144 is provided for controlling the frequency of the 1st L.O. to be scanned. A scan Program Controller (SPC) 144 has at least two output terminals, 147 and 148. A voltage level signal from SPC 144 is applied to the VFT 142 terminal 148 for controlling the transmit frequency $f_1$ of the VFT 142. A second voltage level signal from SPC 144 is applied to the 1st L.O. 146 via terminal 147 for establishing the frequency of the 1st L.O. 146.

The transmit frequency $f_1$ generated by the VFT 142 is applied to the transmit elements 130 via directional coupler 188, conductor 152, waveguide 132 and directional couplers 134. It is to be understood that if the VFT 142 is sensitive to its load (i.e., elements 130, waveguide 132 and couplers 134) any well known isolator may be inserted for isolating the VFT 142 from the variable impedance presented by the transmit section of the system as the transmit frequency $f_1$ varies.

The frequency $f_2$ generated by the 1st L.O. 146 is applied to each of the mixers 138 via conductor 154, waveguide 156, directional couplers 158 and conductor 160. The 1st L.O. frequency $f_2$ is then mixed with reflections of the transmit frequency $f_1$, which are received by the receive elements 140 and also applied to each of the mixers 138, so as to develop a 1st I.F. $f_3$. The 1st I.F. $f_3$ is coupled to the second mixer 162 via the CFL 136 and conductor 164. The frequency generated by the 2nd L.O. 166 is also applied to the 2nd mixer 162, which is tuned to pass a second I.F. $f_4$. The 2nd I.F. $f_4$ developed by the second mixer 162 is applied to the 2nd I.F. Frequency Amplifier and Automatic Frequency Control Discriminator (2nd I.F. Amp and AFCD) circuit 168. The amplified 2nd I.F. $f_4$ may then be connected to appropriate video and display circuits 170 via output terminal 172 of the 2nd I.F. Amp. and AFCD 168. The 2nd I.F. Amp and AFCD circuit 168 also develops a second output signal which is delivered via terminal 174 to the automatic frequency control (AFC) circuit 176. The output signal of the AFC circuit 176 is the delivered to the second L.O. 166 via terminal 178, wherein, it is utilized to establish and fine control the frequency generated by the second L.O. 166. The circuit which includes the AFCD section of the 2nd I.F. Amp and AFCD circuit 168, the AFC circuit 176, and the second L.O. 166 constitute what is commonly referred to as an AFC "loop."

It should be noted that the waveguides 132 and 156 are respectively terminated by conventional resistive loads 180 and 182. As noted above with regard to the embodiment of FIG. 1. other well known AFC loop circuits may be readily substituted without departing from the spirit and scope of the present invention. Also, any well known frequency control type oscillator, such as backward wave oscillators, may be incorporated as the 1st and 2nd L.O. if so desired.

Referring now to the lower portion of FIG. 8, there is shown a phase locked loop circuit, generally indicated at 184.

The transmit frequency generated by the VFT is coupled to a reference waveguide 186, via directional coupler 188 while the frequency $f_2$ generated by the 1st L.O. 146 is coupled to the reference waveguide 186 via conductor 190 and directional coupler 192. The transmit and 1st L.O. frequencies, $f_1$ and $f_2$, are simultaneously applied to a 1st phase detector 194 via directional coupler 196 and conductor 198. The two frequencies are then simultaneously applied to filter circuits 200 and 202. Filter 200 passes only the transmit frequency $f_1$ whereas filter 202 passes only the 1st L.O. frequency $f_2$. Separate waveguide paths are required for the transmit and 1st L.O. frequencies so that a predetermined phase shift of these frequencies will occur as they propagate down the waveguides to the point at which they are recombined. The transmit and 1st L.O. frequencies, after a predetermined phase shift, are recombined and applied to a second phase detector 204 via waveguide 206 and 208, respectively and directional coupler 210. The output signals of phase detectors 194 and 204 are each delivered to the Differential Amplifier (Dif. Amp) 214. The output signal of the Dif. Amp. 214 is then coupled to the 1st L.O. 146 via terminal 216 and conductor 218. It should be noted that the waveguides 186, 206 and 208 are conventionally terminated by the resistive load 212. The terminating loads 180 and 182 of waveguide 132 and 156 respectively, and the terminating load 212 of waveguide 186–206–208 are included to prevent unwanted reflections of the signals traveling along the respective waveguides.

*Mode of operation—FIGURE 8*

With reference to the block diagram of FIG. 8 in view of FIGS. 2–7, the operation of this second exemplary embodiment is as follows:

The physical lengths $d_T{}^1$ and $d_R{}^1$ and the electrical characteristics of the transmit and receive elements 130 and 140 and the waveguides 132 and 156, respectively, are specifically chosen so as to provide a main lobe having a null beamwidth $\theta_{NT}$ which is substantially twice the lobe spacing $\theta_{SR}$ between adjacent grating lobes of the receive pattern.

The transmit frequency $f_1$, developed by the VFT 142 and SPC 144 is varied over a range of frequencies $f_1{}^1 \ldots f_1{}^N$, thereby angularly steering the main lobe of the transmit pattern over a total area to be scanned, such as 90° to 180°, or over a predetermined angular sector substantially smaller than the total area to be scanned, such as 2° to 6°.

The 1st L.O. frequency $f_2$, developed by the 1st L.O. 146 and SPC 144 is also varied over a predetermined range of frequencies $f_2{}^1 \ldots f_2{}^N$, thereby angularly steering grating lobes of the receive pattern over an angular sector substantially smaller than the total area to be scanned, such as 2° to 6°.

At the beginning of a total scan, the frequencies $f_1$ and $f_2$ of VFT 142 and 1st L.O. 146, respectively, are predeterminedly established so that the main lobe 70 is aligned for example with the grating lobe 80, as shown in FIGS. 2 and 3. The frequency $f_1$ of the VFT 142 is then varied over a predetermined range of frequencies, $f_1{}^1 \ldots f_1{}^N$ thereby causing the main lobe 70 to scan across the total area to be scanned. The SPC 144 controls the frequency sweep of both the VFT 142 and 1st L.O. 146. When the point of maximum amplitude 72 of main 70 aligns with the point of maximum amplitude 82 of grating lobe 80, the SPC 144 causes the frequency $f_2$ of 1st L.O. 146 to vary in synchronism with the frequency $f_1$ of VFT 142. This synchronized variation of frequencies $f_1$ and $f_2$ causes the main lobe 70 to be aligned with the grating lobe 80 until the grating lobe 80 reaches the extremity of its sector scan. Since the main lobe 70 has not reached the extremity of its scan, further variation of the frequency $f_1$ causes the main lobe 70 and grating lobe 80 to go out of alignment. At this point, the SPC 144 causes the frequency $f_2$ of the 1st L.O. 146 to return to its original frequency $f_2{}^1$ thereby causing the grating lobes 80, 86 . . . etc. to return to their original pointing angles. When the main lobe 70 aligns with the grating lobe 86, the NFT 142 again causes the frequency $f_2$ of the 1st L.O. 146 to vary in synchronism with frequency $f_1$ of the VFT 142 thereby causing the main lobe 70 to be aligned with the grating lobe 86 until it reaches the extremity of its sector scan. The foregoing main lobe and grating lobe alignment and synchronized transmit and receive frequency variation is repeated until the main lobe 70 reaches the extremity of its scan whereby both the VFT 142 frequency $f_1$ and the 1st L.O. 146 frequency $f_2$ are returned to their original frequency $f_1{}^1$ and $f_2{}^1$, respectively, and a second total area scan commenced if desired.

The signals (in this case the reflected transmit frequency $f_1$) received by the receive elements 20 are respectively delivered to the mixers 138 and mixed with the local oscillator frequency $f_2$ so as to develop a first Intermediate Frequency (1st I.F.) or difference frequency $f_3$. The 1st I.F. $f_3$ is then coupled to the 2nd mixer 162 via CFL 136 and conductor 164 where it is mixed with the frequency developed by the 2nd L.O. 166 so as to develop a second Intermediate Frequency (2nd I.F.) $f_4$. The 2nd I.F. $f_4$ is then delivered to the 2nd I.F. Amp and AFCD 168. A portion of the second I.F. $f_4$ is then amplified and coupled to conventional video and display circuits 176 (or to any desired signal utilization circuit) while the remaining portion of the 2nd I.F. $f_4$ is coupled to a conventional AFC Discriminator circuit in the 2nd I.F. Amp and AFCD 168. The signal developed by the AFCD section to the 2nd I.F. Amp and AFCD 168 is then fed to an AFC circuit 176 wherein an AFC signal is developed for maintaining the frequency of the second L.O. 166 at a desired value. The frequency of the 2nd L.O. 166 may, however, be primarily controlled by the SPC 144 if so desired. As mentioned above, an isolator may be included in the circuit for isolating the VFT 142 from the variable impedance presented by the transmit elements 10 as the transmit frequency $f_1$ varies. The terminating loads 180 and 182 prevent unwanted reflections of the signals traveling along the waveguides 132 and 156 respectively.

Precise main lobe and grating lobe registration and tracking is accomplished by the incorporation of the phase locked loop circuit 184. While the transmit frequency $f_1$ and 1st L.O. frequency $f_2$ are varying, the phase locked loop 184 maintains precise registration of the main lobe of the transmit pattern and the selected grating lobe of the receive pattern by deriving an error signal which is applied to the 1st L.O. 146 so as to vary the 1st L.O. frequency $f_2$ by the precise amount necessary to maintain main lobe and grating lobe alignment or coincidence. The operation of the phase locked loop 184 is as follows:

In order to maintain main lobe and grating lobe alignment during the synchronized frequency sweep of the VFT 142 and 1st L.O. 146, the phase shift $(\Delta\phi_1)$ experienced by the transmit frequency $f_1$ as it propagates through the reference waveguides 206 must be equal, within an integral multiple of $2\pi$, to the phase shift $(\Delta\phi_2)$ experienced by the 1st L.O. frequency $f_2$ as it propagates down the reference waveguide 208. The transmit and 1st L.O. frequencies $f_1$ and $f_2$ are simultaneously fed to phase detector 194 and filter 200 and 202 which are located electrically at the input of referenced waveguides 206 and 208, respectively. Filters 200 and 202 are used to eliminate $f_2$ from reference waveguide 206 and $f_1$ from reference waveguide 208, respectively. The outputs of reference waveguides 206 and 208 are coupled to the phase detector 204. If we represent the transmit and 1st L.O. frequencies as $$(f_1|\phi_1) \text{ and } (f_2|\phi_2)$$

respectively, as they are delivered to the waveguide input phase detector 194, and represented these frequencies as $$(f_1|\phi_1+\Delta\phi_1) \text{ and } (f_2|\phi_2+\Delta\phi_2)$$

respectively, as they are delivered to the waveguide output phase detector 204, then the output of the differential amplifier 214, which represents a voltage output proportional to the difference of the outputs of the phase detectors 194 and 204, will be $(\Delta\phi_1-\Delta\phi_2)$. The voltage output of the differential amplifier 214, which constitutes an error voltage, is applied to the 1st L.O. 146 via output terminal 216 and conductor 218, thereby causing the frequency $f_2$ of the 1st L.O. 146 to vary until the phase differential $(\Delta\phi_1-\Delta\phi_2)$ of the transmit and 1st L.O. frequencies is driven to zero. The multiple of $2\pi$ phase difference which will then exist between $\Delta\phi_1$ and $\Delta\phi_2$ is related to the particular transmit and receive lobes which are aligned.

The physical length $L_{RG_1}$ of the reference waveguide 206 is preferably equal to the product of the physical distance $d_R$ between the receive elements 140 and the physical length L of the serpentine waveguide 132 between the transmit elements 130 divided by the physical distance $d_T{}^1$ between the transmit elements 120, whereas, the physical length $L_{RG_2}$ of the reference waveguide 208 is preferably equal to the physical distance $d_R{}^1$ between the receive elements 140. That is to say, $$L_{RG_1}=\frac{Ld_R{}^1}{d_T{}^1}$$

and $$L_{RG_2}=d_R{}^1$$

where, $L_{RG_1}$=physical length of waveguide 206
$L_{RG_2}$=physical length of waveguide 208
$d_R{}^1$=physical distance between adjacent receive elements 140
$d_T{}^1$=physical distance between adjacent transmit elements 130
$L$=physical distance of serpentine waveguide 132 between adjacent transmit elements 130

It is to be understood that although the foregoing exemplary embodiments of the present invention utilize a filled in transmit array and a grating lobe receive array, the receive array may be a filled in array and the transmit array a grating lobe array without departing from the spirit and scope of the present invention. That is to say, by virtue of the antenna reciprocity theorem the functions and mechanization of the transmit and receive arrays may be interchanged.

It will be apparent from the foregoing that the present invention provides a unique antenna system and technique for use in combination with radar and radio navigation networks which system has high angular and range resolution, operates in real time, provides forward looking capability, has reduced performance degradation under extreme atmospheric conditions and has reduced maintenance requirements.

The generation of an unambiguous single lobe transmit array in combination with a grating lobe receive array uniquely permit an effective scan over the total forward looking area of the system and advantageously reduce the number of receive elements necessary for a given array length or product beamwidth. This reduced space requirement and simplicity of design of the present antenna scanning system render it more aerodynamically compatible with high speed radar carrying vehicles, and the use of an unambiguous single lobe transmit array advantageously reduces Electronic Countermeasure (ECM) vulnerability.

The use of two independent frequency steering mechanisms for controlling the main lobe and grating lobe pattern relationship eliminates inherent grating lobe ambiguity and provides a capability for scanning across a considerably large angular area or a small angular sector as the case may be.

For exemplary purposes only, the following parameters and performance data are included:

Dimensions:
    25 ft. x 3 in. x 4 in. (receive array)
    3 ft. x 3 in. x 1 ft. (transmit array)
Weight—30 lbs. (excluding mounting hardware)
Frequency—16.5 K mc.
Horizontal beamwidth—1.8 milliradians
Horizontal resolution—1.8 milliradians (3 db—two-way)
Vertical beamwidth—15 degrees
Gain—54 db (net two-way)

While several embodiments of the present invention have been described in detail, it is to be understood that other modifications are contemplated which would be apparent to persons skilled in the art without departing

I claim:

1. An antenna scanning arrangement for use with transmit and receive antenna arrays comprising:
    (a) a transmit and receive array each having a plurality of antenna elements thereon;
    (b) said elements on each array benig predeterminedly positioned so as to create a transmit pattern having a single main lobe and a receive pattern having a plurality of spaced grating lobes;
    (c) first steering means for steering said main lobe of said transmit pattern over a total angular area to be scanned;
    (d) second steering means for steering each of said grating lobes of said receive pattern over an angular sector which is substantially smaller than said total area, said grating lobes spanning an angular area which is substantially equal to said total area;
    (e) control means for controlling said first and second steering means so that the point of maximum amplitude of said main lobe of said transmit pattern may be selectively aligned with the point of maximum amplitude of any one grating lobe of said receive pattern so as to produce an unambiguous product pattern having a single reinforced lobe; and
    (f) said control means including means for coordinating the movement of said aligned main and grating lobes so that said angular sector may be continuously scanned.

2. An antenna scanning arrangement in accordance with claim 1, wherein:
    (a) said main lobe of said transmit pattern has a null beamwidth which is substantially equal to twice the angular spacing between any two adjacent grating lobes of said receive pattern.

3. An antenna scanning arrangement in accordance with claim 1, wherein:
    (a) said control means is capable of causing said main lobe to successively align with adjacent grating lobes so that successive angular sectors within said total area may be scanned.

4. An antenna scanning arrangement in accordance with claim 3, wherein:
    (a) the angular sections between adjacent grating lobes are substantially equal; and
    (b) said angular sectors are substantially equal to said angular sections so that said total area is thereby scanned by the successive alignment of said main lobe with adjacent grating lobes.

5. An antenna scanning arrangement for use with a radar system having a single-lobe transmit antenna array and a grating lobe receive antenna array:
    (a) said arrays being substantially parallel and each having a plurality of antenna elements thereon;
    (b) said elements on each array being spaced in a predetermined manner on said arrays so as to create a transmit pattern having a single main lobe and a receive pattern having a plurality of spaced grating lobes;
    (c) means for independently steering said transmit and receive pattern with respect to each other so as to align said main lobe of said transmit pattern with a selected grating lobe of said receive pattern, thereby eliminating lobe ambiguities at each pattern;
    (d) said steering means including means for aligning the point of maximum amplitude of said main lobe of said transmit pattern with the point of maximum amplitude of a selected grating lobe of said receive pattern so as to produce an unambiguous product pattern having a single reinforced lobe;
    (e) said steering means also including means for steering any reinforced lobe over an angular sector which is substantially smaller than a predetermined total angular area to be scanned; and
    (f) said steering means further including means for causing said product pattern to be reinforced at any pointing angle within said total area to be scanned.

6. An antenna scanning arrangement in accordance with claim 5, wherein:
    (a) said main lobe of said transmit pattern has a null beamwidth which is substantially twice as large as the angular spacing between at least two adjacent grating lobes of said receive pattern.

7. An antenna scanning system for use in combination with high resolution radar systems having a single-lobed transmit antenna array and a grating lobe receive antenna array comprising:
    (a) transmit and receive arrays with each array having a plurality of antenna elements thereon;
    (b) said elements on each array being predeterminedly positioned so as to create a receive pattern having a plurality of spaced grating lobes and a transmit pattern having a single main lobe;
    (c) said main lobe of said transmit pattern having a null beamwidth which is substantially equal to the angular spacing between any three successive grating lobes of said receive pattern so that the product of said patterns reinforces only in the direction in which the point of maximum amplitude of said main lobe of said transmit pattern aligns with the point of maximum amplitude of one grating lobe of said receive pattern;
    (d) first frequency generating means coupled to said transmit elements for steering said main lobe of said transmit pattern over a total angular area to be scanned;
    (e) second frequency generating means coupled to said receive elements for steering said grating lobes of said receive pattern over an angular sector which is substantially smaller than said total area;
    (f) control means coupled to said first and second frequency generating means for controlling the frequencies thereof so that the point of maximum amplitude of said main lobe of said transmit pattern may be selectively aligned with the point of maximum amplitude of one grating lobe of said receive pattern so as to produce an unambiguous product pattern having a single reinforced lobe;
    (g) said control means including means for causing said aligned main and grating lobes to synchronously scan said angular sector within said total area so that said reinforced lobe will be caused to scan said angular sector;
    (h) said control means further including means for causing said product pattern to be reinforced at any predetermined pointing angle so that any angular sector within said total area may be scanned.

8. An antenna scanning system in accordance with claim 7, wherein:
    (a) said control means being capable of causing the frequency of said first frequency generating means to vary so that said product pattern may be successively reinforced at discrete pointing angles within said total area, whereby successive angular sectors within said total area may be scanned.

9. An antenna scanning system in accordance with claim 8, wherein:
    (a) the angular sections between adjacent pointing angles of said reinforced lobe are substantially equal; and
    (b) said angular sectors are substantially equal to said angular sections so that each successive reinforced lobe is caused to scan the area between adjacent pointing angles, whereby said total area is scanned by the successive alignment of said main lobe with adjacent grating lobes.

10. An antenna system in accordance with claim 9, wherein:

(a) said first frequency generating means comprises a hydraulically tuned magnetron and servo circuit for generating the frequency thereof, and a modulator and driver circuit for establishing the frequency of said magnetron and servo circuit; and (b) said control means develops at least three control signals, one signal for controlling said modulator and driver circuit, one signal for causing said second generating means to sweep over a predetermined range of frequencies so that said grating lobes of said receive pattern are caused to scan said angular sector, and one signal for causing said first generating means to sweep over a predetermined range of frequencies so that said main lobe of said transmit pattern is caused to scan said total area.

11. An antenna scanning system in accordance with claim 9, wherein:
(a) said control means develops at least two control signals, one signal for establishing the frequency of said first generating means and for causing said first generating means to sweep over a predetermined range of frequencies so that said main lobe of said transmit pattern is caused to scan said total area, one signal for causing said second generating means to sweep over a predetermined range of frequencies so that said grating lobes of said receive pattern are caused to scan said angular sector; and
(b) phase lock means coupled to said first and second generating means for shifting the frequency of said second generating means with respect to the frequency of said first generating means so as to maintain a given relationship between the frequencies of said first and second generating means during said frequency sweeps of said first and second generating means.

12. An antenna scanning system in accordance with claim 11, wherein:
(a) said phase lock means comprises first and second waveguides each having an input and output, first and second phase detectors each having an input and output, first and second filters each having an input and output, and a differential amplifier having two inputs and an output;
(b) said frequencies of said first and second generating means being simultaneously coupled to the input of said filters and to the input of one of said phase detectors;
(c) said outputs of said filters being respectively connected to the inputs of said waveguides for coupling one of said frequencies to its respective waveguide;
(d) said outputs of said waveguides being connected to the input of said other phase detector for coupling said frequencies to said other phase detector;
(e) said outputs of said phase detectors being respectively connected to said inputs of said differential amplifier for coupling said frequencies to said differential amplifier so as to develop a control voltage; and
(f) said output of said differential amplifier being connected to said second generating means for coupling said control voltage to said second generating means so that the frequency of said second generating means may be shifted proportionally with respect to the frequency of said first generating means during the frequency sweeps of said first and second generating means.

13. An antenna scanning system in accordance with claim 12, wherein:
(a) the physical length of said first and second waveguides is represented respectively by the expressions, $$L_{RG_1} = \frac{L}{d_T^1} = \frac{L}{d_T^1} d_R^1$$

and, $$L_{RG_2} = d_R^1$$

where, $L_{RG_1}$ = physical length of said first waveguide
$L_{RG_2}$ = physical length of said second waveguide
$d_R^1$ = physical distance between said receive elements
$d_T^1$ = physical distance between said transmit elements
$L$ = physical distance of transmission coupling means between said transmit elements 14. An antenna scanning system for use in combination with high resolution radar systems, comprising:
(a) a plurality of transmit antenna elements for transmitting a first frequency;
(b) a plurality of receive antenna elements for receiving reflections of said first frequency, which contains intelligence;
(c) said transmit and receive elements being physically positioned in transmit and receive arrays, respectively, and having predetermined electrical characteristics so as to respectively create a transmit pattern having a single main lobe and a receive pattern having a plurality of spaced grating lobes;
(d) said main lobe of said transmit pattern having a null beamwidth which is substantially equal to the angular spacing between any three successive grating lobes of said receiver pattern so that the product of said patterns reinforces only in the direction in which the point of maximum amplitude of said main lobe of said transmit pattern aligns with the point of maximum amplitude of one grating lobe of said receive pattern;
(e) a first frequency generator coupled to said transmit elements for generating said first frequency;
(f) first coupling means for coupling said first frequency from said frequency generator to each of said transmit elements;
(g) a second frequency generator coupled to said receive elements for generating a second frequency;
(h) a plurality of mixers respectively coupled to said receive elements;
(i) second coupling means for respectively coupling said second frequency from said second generator to said mixers;
(j) said mixers being adapted to mix said reflections of said first frequency, which are received by said receive elements, and said second frequency, which is generated by said second generator, so as to develop a third frequency;
(k) control means coupled to said first and second generators for controlling the frequencies thereof so that said point of maximum amplitude of said main lobe of said transmit pattern may be selectively aligned with said point of maximum amplitude of one grating lobe of said receive pattern so as to produce an unambiguous product pattern having a single reinforced lobe;
(l) said control means being coupled to said first generator for causing said first frequency to sweep over a predetermined range of frequencies so that said main lobe will scan the total angular area to be scanned;
(m) said control means being also coupled to said second generator for causing said second frequency to sweep over a predetermined range of frequencies so that said grating lobes of said receive pattern will be caused to scan over an angular sector which is substantially smaller than said total area;
(n) said control means including means for shifting the frequency of said second generator with respect to the frequency of said first generator so as to maintain a given relationship between the frequencies of said first and second generators during said frequency sweeps of said first and second generators;

(o) display means for developing a fourth frequency and for displaying the intelligence carried by said fourth frequency; and (p) third coupling means for coupling said third frequency, which is developed by said plurality of mixers, to said display means.

15. An antenna scanning system in accordance with claim 14, wherein:
(a) said first generator comprises a hydraulically tuned magnetron and servo circuit for generating said first frequency, and a modulator and driver circuit for establishing the frequency of said magnetron and servo circuit;
(b) said first coupling means comprising a waveguide coupled between said first generator and each of said transmit elements;
(c) said second coupling means comprising a second waveguide coupled between said second generator and each of said mixers;
(d) said third coupling means comprises a third waveguide coupled between said display means and each of said receive elements;
(e) said control means develops at least three control signals, one signal for controlling said modulator and driver circuit, one signal for causing said second generator to sweep over a predetermined range of frequencies so that said grating lobes of said receive pattern are caused to scan said angular sector, and one signal for causing said first generator to sweep over a predetermined range of frequencies so that said main lobe of said transmit pattern is caused to scan said total area.

16. An antenna scanning system for use in combination with high resolution radar systems, comprising:
(a) a plurality of transmit antenna elements for transmitting a first frequency;
(b) a plurality of receive antenna elements for receiving reflections of said first frequency, which contains intelligence;
(c) said transmit and receive elements being physically positioned in transmit and receive arrays, respectively, and having predetermined electrical characteristics so as to respectively create a transmit pattern having a single main lobe and a receive pattern having a plurality of spaced grating lobes;
(d) said main lobe of said transmit pattern having a null beamwidth which is substantially equal to the angular spacing between any three successive grating lobes of said receiver pattern so that the product of said pattern reinforces only in the direction in which the point of maximum amplitude of said main lobe of said transmit pattern aligns with the point of maximum amplitude of one grating lobe of said receive pattern;
(e) a first frequency generator coupled to said transmit elements for generating said first frequency;
(f) first coupling means for coupling said first frequency from said frequency generator to each of said transmit elements;
(g) a second frequency generator coupled to said receive elements for generating a second frequency;
(h) a plurality of mixers respectively coupled to said receive elements;
(i) second coupling means for respectively coupling said second frequency from said second generator to said mixers;
(j) said mixers being adapted to mix said reflections of said first frequency, which are received by said receive elements, and said second frequency, which is generated by said second generator, so as to develop a third frequency;
(k) control means coupled to said first and second generators for controlling the frequencies thereof so that said point of maximum amplitude of said main lobe of said transmit pattern may be selectively aligned with said point of maximum amplitude of one grating lobe of said receive pattern so as to produce an unambiguous product pattern having a single reinforced lobe;
(l) said control means being coupled to said first generator for causing said first frequency to sweep over a predetermined range of frequencies so that said main lobe will scan the total angular area to be scanned;
(m) said control means being also coupled to said second generator for causing said second frequency to sweep over a predetermined range of frequencies so that said grating lobes of said receive pattern will be caused to scan over an angular sector which is substantially smaller than said total area;
(n) phase lock means coupled to said first and second generators for shifting the frequency of said second generator with respect to the frequency of said first generator so as to maintain a given relationship between the frequencies of said first and second generators during said frequency sweeps of said first and second generators;
(o) display means for developing a fourth frequency and for displaying the intelligence carried by said fourth frequency; and
(p) third coupling means for coupling said third frequency which, is developed by said plurality of mixers, to said display means.

17. An antenna scanning system in accordance with claim 16, wherein:
(a) said first generator comprises a variable frequency transmitter for generating said first frequency;
(b) said first coupling means comprising a waveguide coupled between said transmitter and each of said transmit elements;
(c) said second coupling means comprises a second waveguide coupled between said second generator and each of said mixers;
(d) said third coupling means comprising a corporate feedline coupled between each of said mixers and said display means;
(e) said control means develops at least two control signals, one signal for establishing the frequency of said first generator and for causing said first generator to sweep over a predetermined range of frequency so that said main lobe of said transmit pattern is caused to scan said total area, and one signal for causing said second generator to sweep over a predetermined range of frequency so that said grating lobes of said receive pattern are caused to scan said angular sector.

18. An antenna scanning method for use with transmit and receive antenna arrays each having a plurality of transmit and receive elements thereon, comprising the steps of:
(a) developing a receive pattern having a plurality of spaced grating lobes;
(b) developing a transmit pattern having a single main lobe with the beamwidth of said main lobe being substantially equal to the angular spacing between at least two adjacent grating lobes of said receive pattern;
(c) aligning the point of maximum amplitude of said main lobe with the point of maximum amplitude of a preselected grating lobe so as to produce an unambiguous product pattern having a single reinforced lobe; and
(d) steering said transmit and receive patterns so as to cause said product pattern to be reinforced at any predetermined pointing angle within a total area to be scanned so that any angular sector within said total area may be scanned.

19. An antenna scanning method in accordance with claim 18, wherein:

(a) said transmit and receive patterns are steered so as to cause said product pattern to successively reinforce at discrete pointing angles within said total area so that successive angular sectors within said total area may be scanned.

20. An antenna method in accordance with claim 19, wherein:
(a) said transmit and receive patterns are steered so as to cause said product pattern to successively reinforce at equal discrete pointing angles within said total area so that each successive reinforced lobe is caused to scan substantially the entire angular section between adjacent pointing angles, whereby said total area is scanned by the successive scanning of said adjacent angular sections.

21. An antenna scanning method for use with high resolution radar systems having transmit and receive antenna arrays with each array having a plurality of transmit and receive elements thereon, comprising the steps of:
(a) developing a receive pattern having a plurality of spaced grating lobes;
(b) developing a transmit pattern having a single main lobe with the beamwidth of said main lobe being substantially equal to the angular spacing between any three successive grating lobes of said receive pattern;
(c) generating a variable first frequency and coupling said first frequency to said transmit elements for steering said main lobe over a total area to be scanned;
(d) generating a variable second frequency and coupling said second frequency to said receive elements for steering said grating lobes over an angular sector which is substantially smaller than said total area to be scanned;
(e) controlling said first and second frequencies so that the point of maximum amplitude of said main lobe of said transmit pattern may be aligned with the point of maximum amplitude of a preselected grating lobe of said receive pattern so as to produce an unambiguous product pattern having a single reinforced lobe; and
(f) shifting said first and second frequencies synchronously over a predetermined range of frequencies so that said aligned main and grating lobes will synchronously scan said angular sector so that said reinforced lobe may be caused to scan any angular sector within said total area.

22. An antenna scanning method in accordance with claim 21, wherein:
(a) said first and second frequencies are controlled so as to cause said product pattern to successively reinforce at discrete pointing angles within said total area so that successive angular sectors within said total angular area may be scanned.

23. An antenna scanning method in accordance with claim 21, wherein:
(a) said first and second frequencies are controlled so as to cause said product pattern to successively reinforce at equal discrete pointing angles within said total angular area so that each successive reinforced lobe is caused to scan substantially the entire angular section between adjacent pointing angles, whereby said total angular area is scanned by the successive scanning of said adjacent angular sections.

References Cited by the Examiner

UNITED STATES PATENTS

| | | | |
|---|---|---|---|
| 2,990,544 | 6/1961 | La Rosa | 343—16 X |
| 3,072,903 | 1/1963 | Meyer. | |

CHESTER L. JUSTUS, *Primary Examiner.*

H. C. WAMSLEY, *Assistant Examiner.*